United States Patent
Sang et al.

(10) Patent No.: US 6,401,147 B1
(45) Date of Patent: Jun. 4, 2002

(54) SPLIT-QUEUE ARCHITECTURE WITH A FIRST QUEUE AREA AND A SECOND QUEUE AREA AND QUEUE OVERFLOW AREA HAVING A TRICKLE MODE AND AN OVERFLOW MODE BASED ON PRESCRIBED THRESHOLD VALUES

(75) Inventors: Jinqlih Sang, Fremont; Edward Yang, San Jose; Bahadir Erimli, Campbell, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/317,147

(22) Filed: May 24, 1999

(51) Int. Cl.[7] .................................................. G06F 3/00
(52) U.S. Cl. ............................ 710/56; 710/14; 710/54; 710/55
(58) Field of Search ........................... 702/229; 710/14, 710/31, 38, 39, 54, 56, 7, 35, 52, 55, 57; 370/235, 390

(56) References Cited

U.S. PATENT DOCUMENTS

| 5,166,930 A | * | 11/1992 | Braff et al. ................ 370/94.1 |
| 5,515,376 A | | 5/1996 | Murthy et al. |
| 5,692,156 A | * | 11/1997 | Bahls et al. ................. 711/165 |
| 5,893,924 A | * | 4/1999 | Bahls et al. ................. 711/165 |
| 5,943,480 A | * | 8/1999 | Neidhardt .................... 709/222 |
| 5,953,020 A | * | 9/1999 | Wang et al. ................. 345/513 |
| 5,953,335 A | * | 9/1999 | Erimli et al. ................ 370/390 |
| 6,061,351 A | * | 5/2000 | Erimli et al. ................ 370/390 |
| 6,084,856 A | * | 7/2000 | Simmons et al. ............ 370/235 |
| 6,263,212 B1 | * | 7/2001 | Ross et al. ................... 455/466 |

* cited by examiner

*Primary Examiner*—Jeffrey Gaffin
*Assistant Examiner*—Rijue Mai

(57) ABSTRACT

A programmable split-queue structure includes a first queue area for receiving entries, a second queue area for outputting entries input to said first queue area, and a queue overflow engine logically coupled to the first queue area and the second queue area. The queue overflow engine functions to transfer entries from the first queue area to the second queue area using one of two transfer modes. The queue overflow engine selects the most appropriate transfer mode based on a prescribed threshold value that can be dynamically programmed. An overflow storage area having high capacity may be provided in an external memory in order to increase the overall capacity of the queue structure.

14 Claims, 10 Drawing Sheets

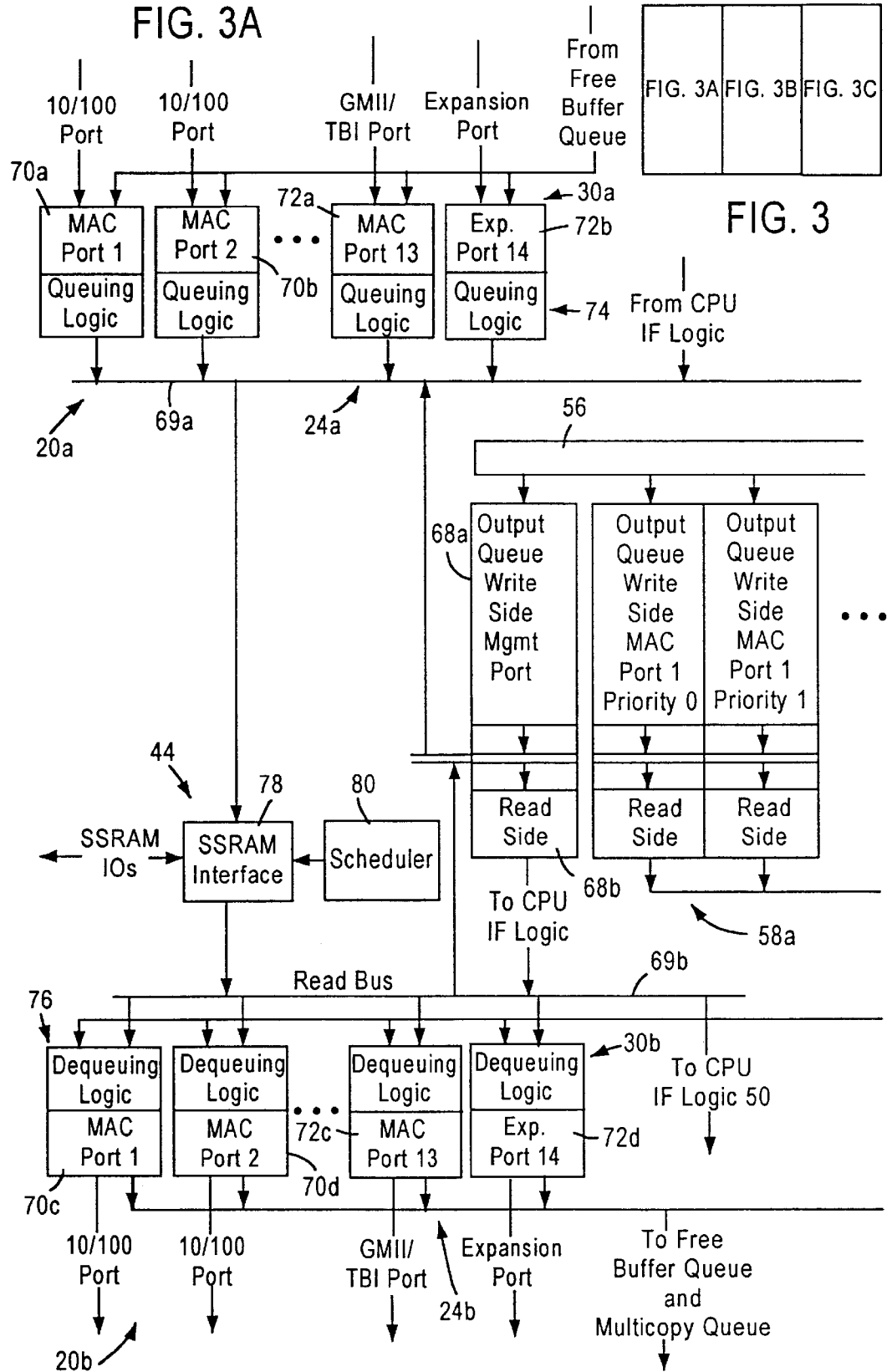

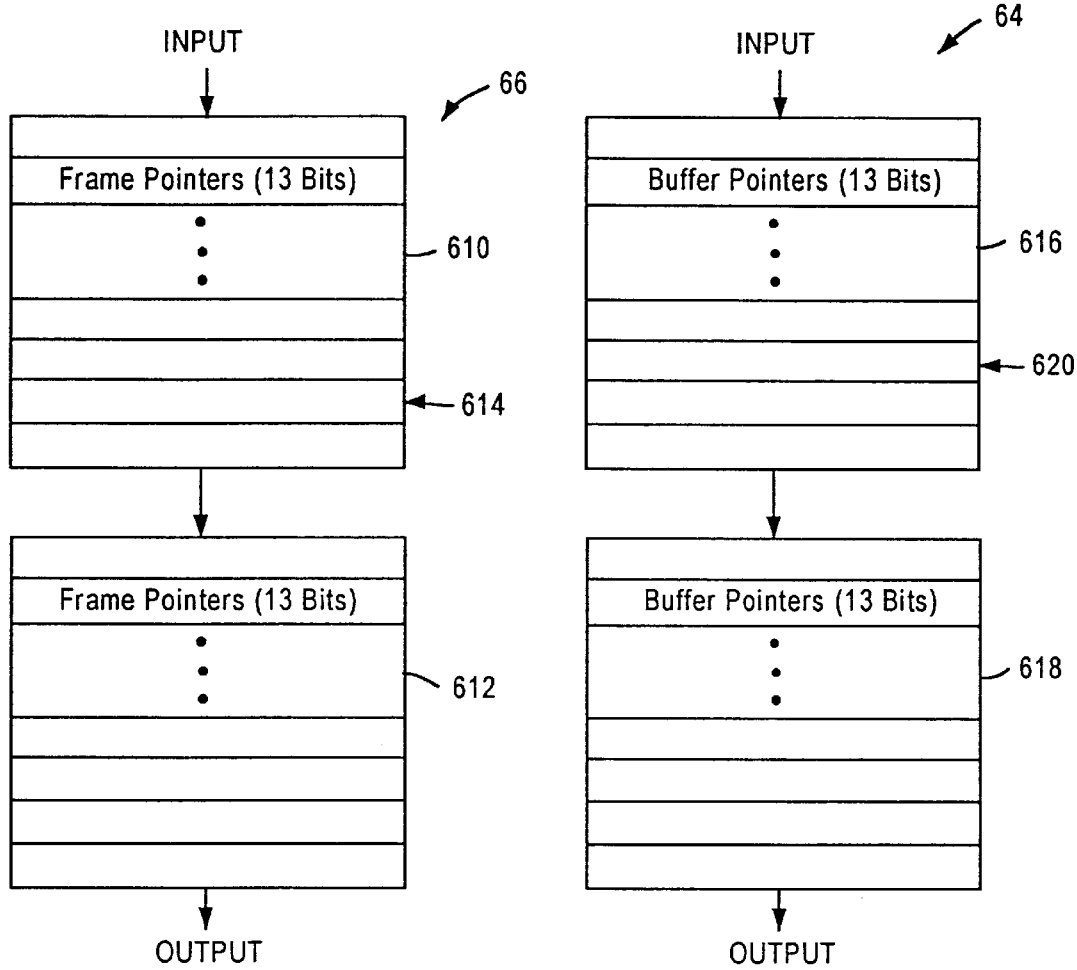
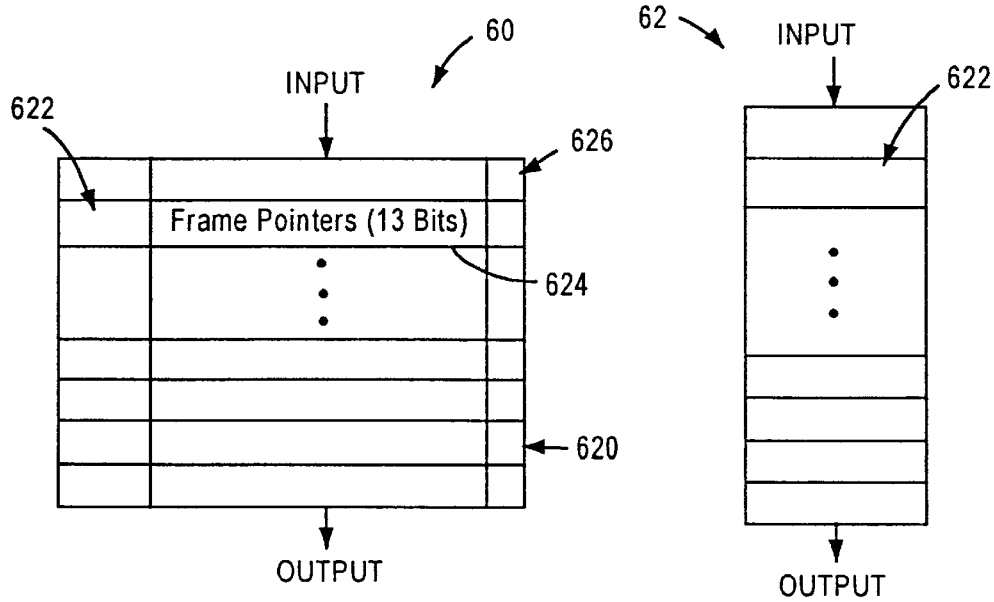
FIG. 6A  FIG. 6B  FIG. 6C  FIG. 6D

SPLIT-QUEUE ARCHITECTURE WITH A FIRST QUEUE AREA AND A SECOND QUEUE AREA AND QUEUE OVERFLOW AREA HAVING A TRICKLE MODE AND AN OVERFLOW MODE BASED ON PRESCRIBED THRESHOLD VALUES

BACKGROUND OF THE INVENTION

1. Field of the Invention

The present invention relates to communication systems, and more particularly, to a method and apparatus for performing diagnostic procedures on queue structures used for storing received data in communication systems.

2. Description of the Related Art

Modern communication systems, such as computer networking systems or communication networks, provide constant transmission of data between end stations and/or intermediate stations such as routers and signal amplifiers. Computer networking, systems, such as packet switched networks (e.g., Ethernet networks), often require transmission of data to a single end station or to multiple end stations within the network. The data originates from a user program and is segmented into multiple data frames, and subsequently transmitted in order to simplify processing and minimize the retransmission time required for error recovery. For example, in a conventional e-mail system, a user may desire to send the same e-mail message to four different users that are connected to the e-mail system. Accordingly, the identical data would be directed to multiple end stations.

Packet switched computer networks typically employ a network switch that receives and forwards data frames to individual and/or multiple end stations. The switch makes forwarding decisions upon receipt of data frames based on information contained in a header of each data frame. For example, if a received data frame is to be transmitted to a number of end stations, the switch must make the forwarding decision to forward the data frame to the ports of the correct end stations. Depending on the specific implementation and/or characteristic of the networking system (i.e., data transfer rate, traffic intensity), buffers must be provided for temporary storage of the data frames, received by the switch, until forwarding decisions can be made. Without the use of buffers, there is a great likelihood that data frames will be lost, hence requiring retransmission and reducing the overall efficiency of the system.

The buffers used by the switch to store the data frames are often implemented as queue structures. There are many types of electronic data systems in which queues are used. These include microprocessors, memory transfer systems, airline telephone reservation systems, and packet switched networks. An example of a queue from everyday life is a customer line, at a bank or an airport ticket counter. In most systems, it is desirable that the queues have low latencies so that processing of an entry is not delayed very long due to delays caused by the queues themselves. A low queue latency means that an entry will flow from the entrance to the queue to the exit of the queue quickly, in comparison to queues with higher latencies. One factor that has a significant impact on the latency of a queue is the length, or capacity, of the queue. The greater the capacity of the queue to store entries, the higher the latency of the queue.

In certain systems, a compromise is typically made between the competing factors of latency and capacity in designing the queue size. For example, the network switch typically receives data frames from multiple ports, and cannot process all of the data frames instantaneously to thereby determine where each should be sent. Hence, a queuing arrangement that queues the received data frames provides the network switch enough time to process the received data frames.

It is often difficult to balance the competing factors of latency and capacity in multiport network switches because of the desire to quickly process received data frames with minimal delay that may be introduced by the queue structure. Regardless of the processing speed of the network switch, it is also important that there is sufficient storage capacity to accommodate large numbers of received data frames. A high storage capacity ensures that received data frames will not be discarded, hence avoiding loss of information even during times of high throughput at the switch.

Further complications arise as a result of the ever-increasing pressure to reduce the size of the chips that embody the device that implements the queue structure, or provide extended functionality in the device. Consequently, the amount of real estate, on the chip, that can be dedicated to the queuing function becomes considerably more expensive. This expense is further increased in devices such as multiport network switches, where each port may be required to have its own queue.

The expense associated with on-chip real estate has traditionally been addressed by providing additional storage area external of the chip (i.e., external memory). The external storage area, however, introduces new problems because access to the "on-chip" memory is considerably faster than access to the external memory. Consequently, latency is significantly increased.

Accordingly, a principal problem associated with implementing queue structures is the need to efficiently balance competing factors such as latency and storage capacity.

Another problem associated with implementing queue structures is the inability to effectively minimize latency when a large storage capacity is available.

DISCLOSURE OF THE INVENTION

There is a need to provide a queue structure and a method of queuing that will satisfy both competing interests of low latency and high capacity, that queues entries to a system with low latency, yet still retains the capacity to handle relatively large amounts of entries when necessary.

There is also a need for a queue structure that is capable of minimizing latency regardless of the amount of external storage capacity available to store entries.

These and other needs are addressed by the present invention wherein a queue structure includes a queue overflow engine that minimizes latency by selectively utilizing an external memory area, based on a prescribed threshold value.

In accordance with one aspect of the present invention, a queue structure comprises a first queue area for receiving entries, a second queue area for outputting entries input to the first queue area, a queue overflow engine logically coupled to the first queue area and the second queue area, and an overflow storage area operatively coupled to the queue overflow engine. The first queue area and the second queue areas each include an input portion and an output portion. The queue overflow engine functions to transfer entries from the first queue area to the second queue area using either a trickle mode or an overflow mode, based on a prescribed threshold value. Depending on the specific system, the threshold value used by the queue overflow engine may correspond to the number of entries stored in the first queue area, the number of entries stored in the second queue area, or both.

According to one implementation of the present invention, the overflow mode requires that the queue overflow engine perform a first transfer of entries from the output portion of the first queue area to the overflow storage area. Next, the queue overflow engine performs a second transfer wherein the entries currently stored in the overflow storage area are transferred to the second queue area. Furthermore, the trickle mode requires that the queue overflow engine transfer entries directly from the output portion of the of the first queue area into the input portion of the second queue area.

According to another implementation, the queue overflow engine attempts to transfer entries into the second queue area using only the trickle mode, in order to minimize latency resulting from access to the external memory area. The queue overflow engine thus monitors the number of entries currently stored in the first and second queue areas. If the first queue area is empty, then the queue overflow engine refrains from transferring entries from the overflow storage area until a minimum threshold value is reached in the second queue area. If additional entries are input to the first queue area before the minimum threshold value is reached, then entries are transferred to the second queue area directly from the first queue area using the trickle mode.

Hence, the queue overflow engine will only transfer entries from the overflow storage area if there are no entries in the first queue area and the number of entries stored in the second queue area is below the minimum threshold value. Such an arrangement is particularly beneficial when the ordering of entries within the queue does not need to be maintained. One benefit of such an arrangement is that it allows for the storage of large quantities of entries using the external storage area and minimize latency by placing a higher priority on the transfer of entries from the first queue area. In addition, various control factors such as, for example, the size of the overflow storage area and the threshold values may be changed dynamically during operation of the system.

In accordance with another aspect of the invention, a method of queuing entries into a queue structure comprises the steps: receiving entries in a first queue area of the queue structure; comparing the number of entries stored in the first queue area to a prescribed threshold value; and transferring entries from the first queue area into the second queue area using either a trickle mode or an overflow mode, based on the step of comparing. The present invention advantageously allows selective transfer of entries from the first queue area based on predetermined conditions that function to optimize storage capacity while minimizing latency.

According to one embodiment of the invention, the trickle mode requires that entries be transferred directly to the second queue area if there is available capacity in the second queue area in order to minimize latency. If there is no available capacity in the second queue area, then the entries are transferred to an overflow storage area in order to maximize the storage capacity of the queue structure.

Additional advantages and novel features of the present invention will be set forth in part in the description which follows, and in part will become apparent to those skilled in the art upon examination of the following, or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 6A is a block diagram illustrating the internal structure of a reclaim queue that may be constructed in accordance with the present invention;

FIG. 6B is a block diagram illustrating the internal structure of a free buffer queue that may be constructed in accordance with the present invention;

FIG. 6C is a block diagram illustrating the internal structure of a multicopy queue that may be constructed in accordance with the present invention;

FIG. 6D is a block diagram illustrating the internal structure of a multicopy cache that may be constructed in accordance with the present invention;

DETAILED DESCRIPTION OF ILLUSTRATIVE EMBODIMENTS

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
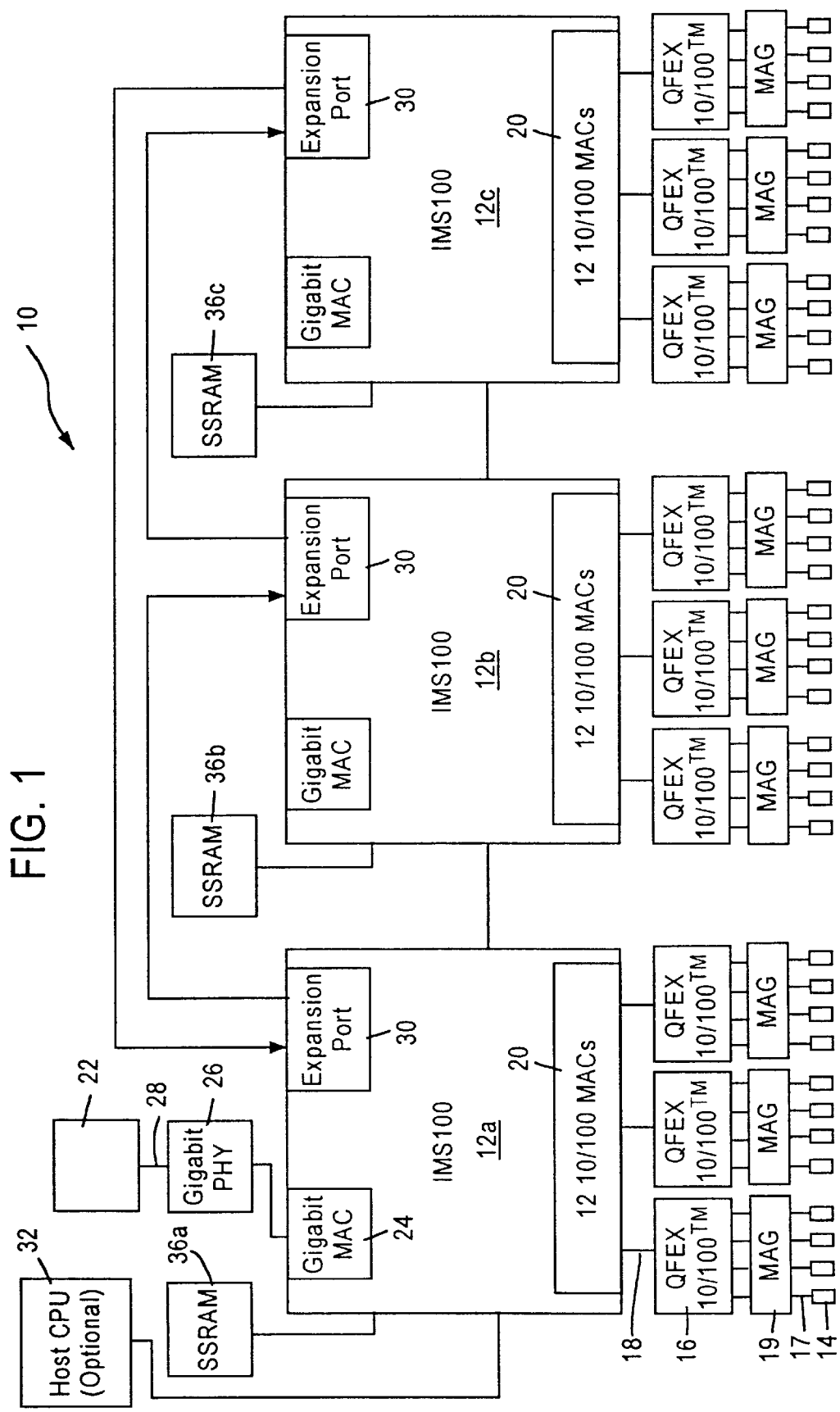
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
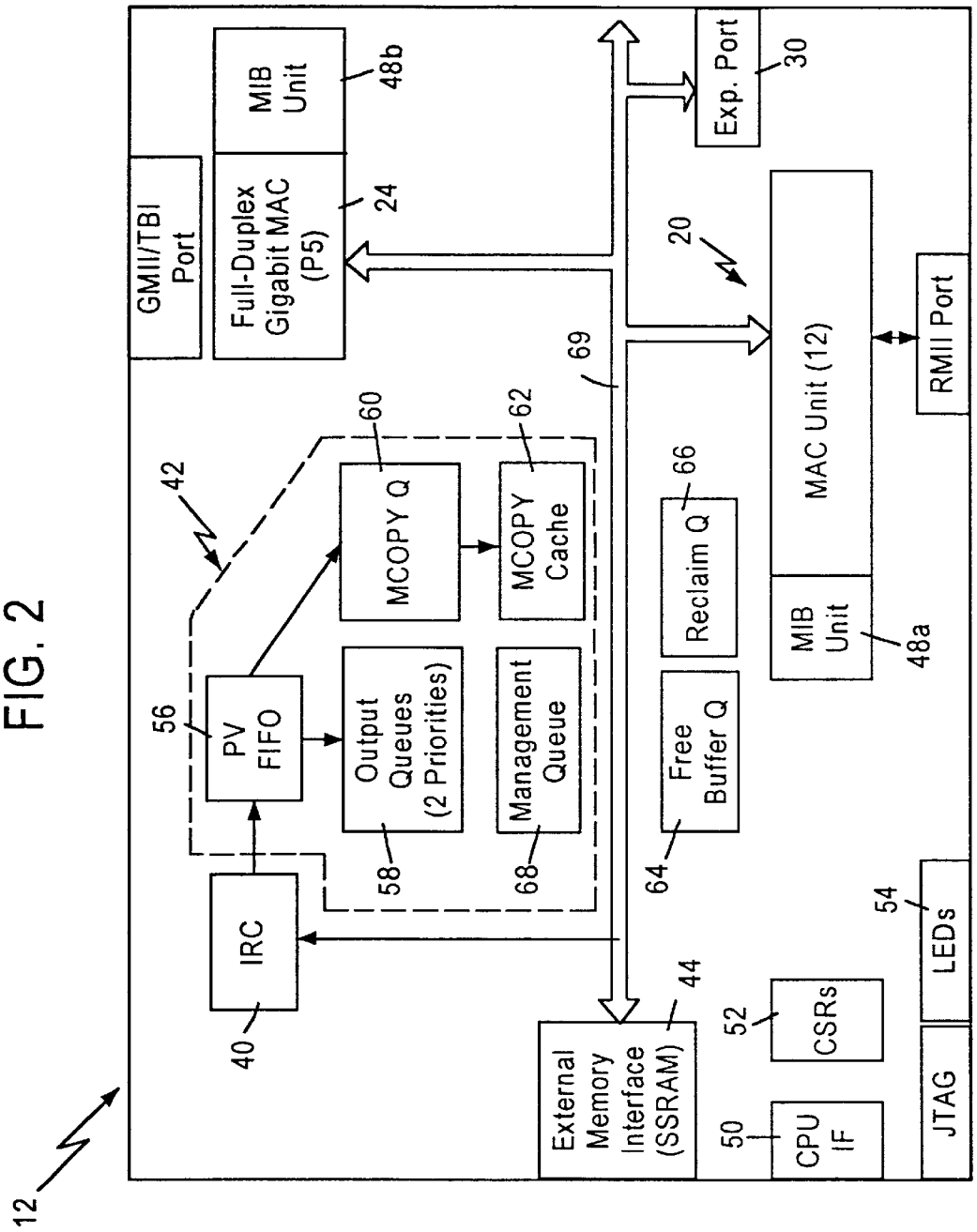
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The format of the forwarding descriptor will discussed further with respect to FIG. 7. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figure 3B:
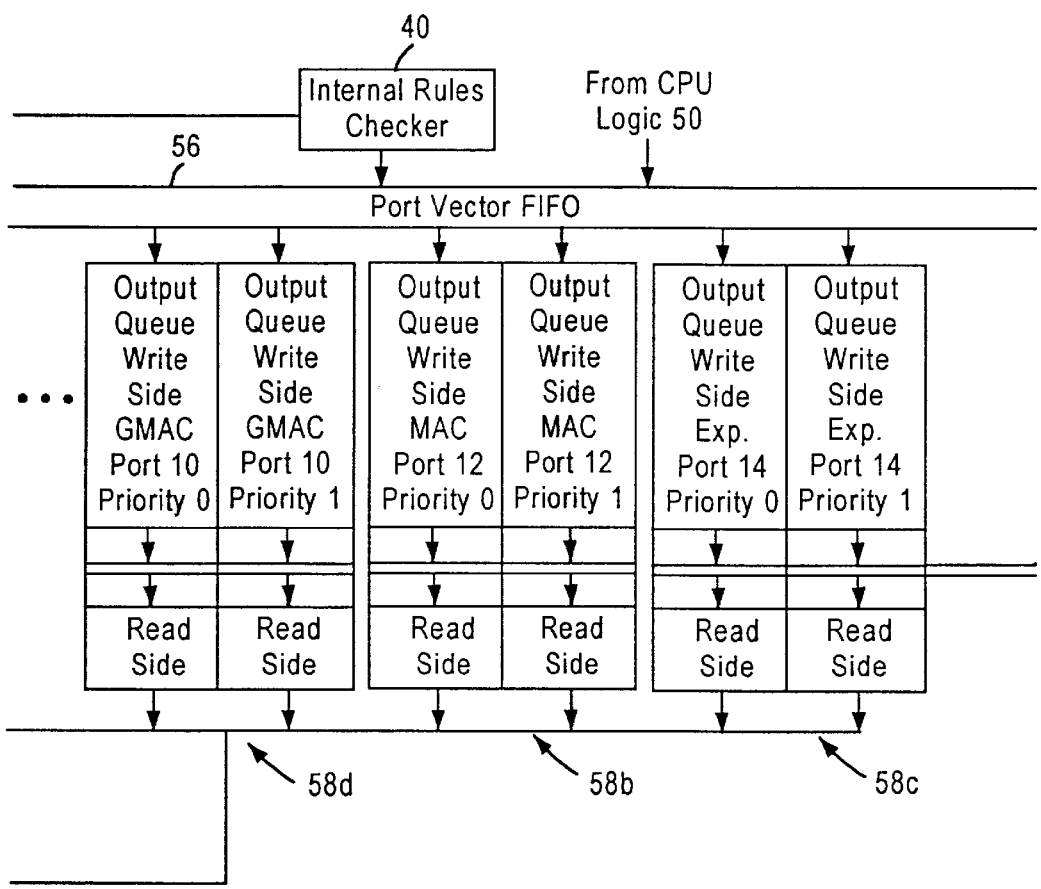
FIG. 3 is a block diagram illustrating in detail the switching subsystem of FIG. 2.
Figure 3C:
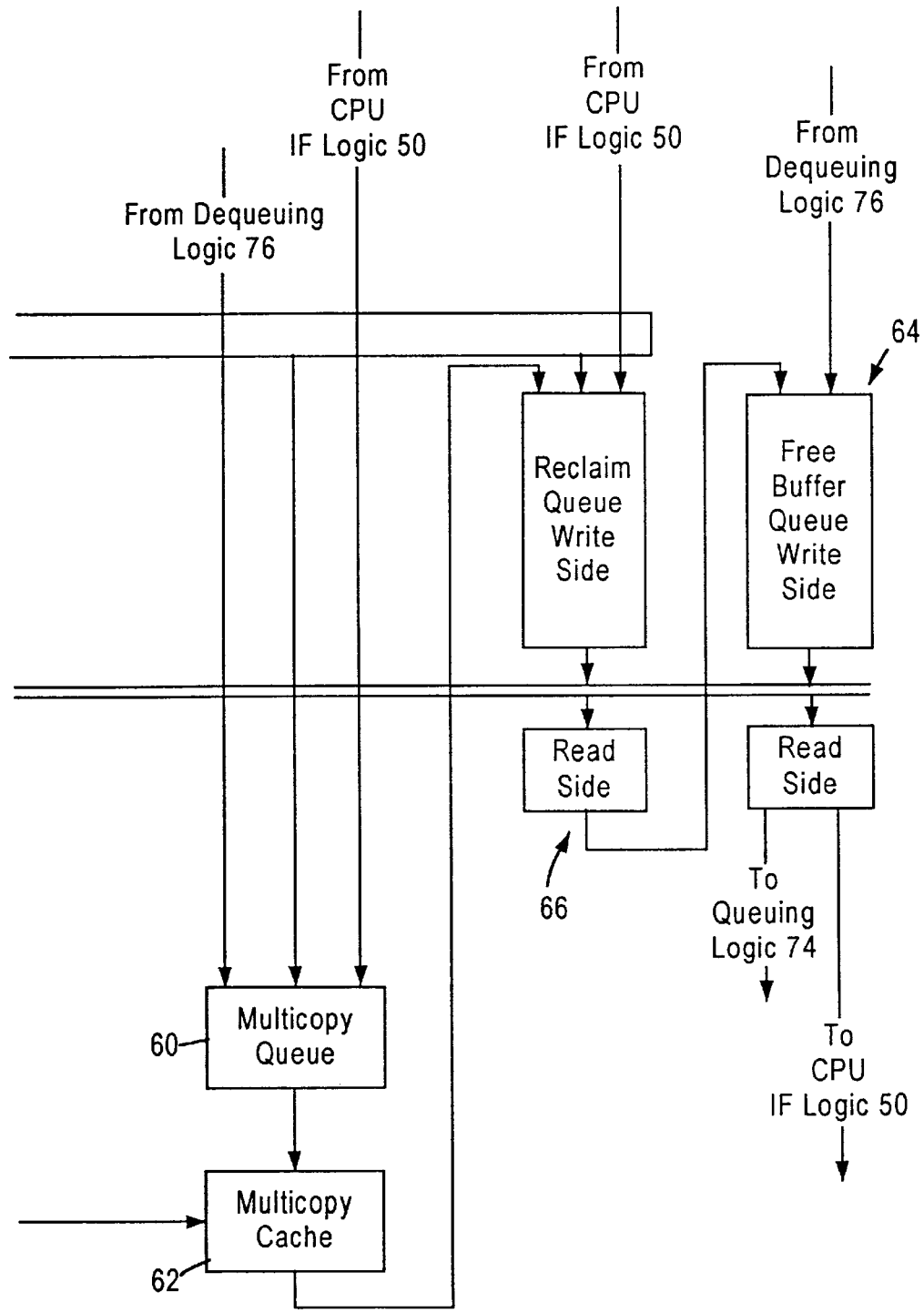

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d)configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the architecture of exemplary queue structures will be discussed, followed by the details for processing the various queue structures of the multiport switch 12.

Queue Structure

Figure 4:
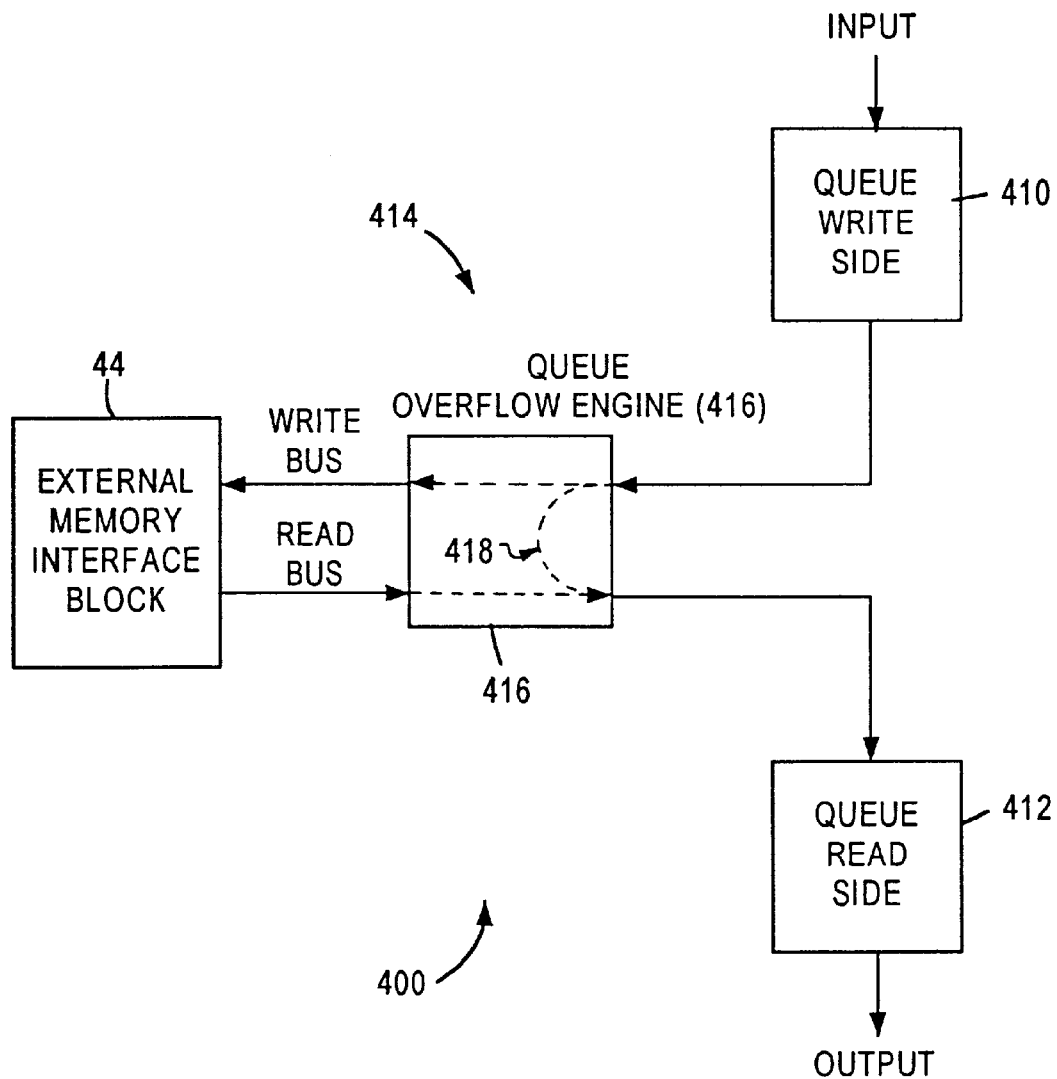
FIG. 4 is a block diagram of an exemplary queue structure constructed in accordance with an embodiment of the present invention.

FIG. 4 is a block diagram of the external structure of an exemplary queue structure 400 having a split-architecture configuration in accordance with an embodiment of the present invention. As is apparent from FIG. 4, the queue structure 400 illustrated has a split architecture having a three-part configuration. For highest performance, it is preferable to keep all of the queuing structure on the chip (referring to the multiport switch 12). The queue structure 400 includes a high performance, low capacity section that is on-chip, and an overflow area that is off-chip. The overflow area allows the queue to serve as a large capacity queue when needed, albeit with a relatively lower performance than the on-chip portion.

The queue structure 400 illustrated in FIG. 4 has three physical sections. These include a queue write side 410, a queue read side 412, and a queue overflow storage area 414 which incorporates a queue overflow engine 416, the external memory interface block 44, and the external memory 36. Access to the external memory 36 for the queue structure 400 is through the external memory interface 34, as described earlier. The present invention takes advantage of the bursting nature of current external memories, so that the data (e.g., frame pointers, forwarding descriptor, etc.) is sent on and off the chip to the queue overflow storage area 414 in bursts over the external memory interface block 44 that connects the network chip 12 to the external memory 36.

The queue write side 410 and the queue read side 412 are located on the multiport switch 12. The write side 410 and the read side 412 are considered to be small, expensive resources. By contrast, the overflow storage area 414, forming the third part of the output queue 400, is large and inexpensive. The write side 410 and the read side 412 provide high performance, while the path through the overflow area provides a low-performance, large capacity path.

In operation, the queue write side 410 receives an entry. According to one exemplary embodiment of the present invention, the entry can be a frame pointer that points to the first buffer in external memory in which the first 256 bytes of a data frame are stored. It should be apparent to those of skill in the art, however, that the queue structure 400 is not limited to frame pointers as entries, but is widely applicable to queue other types of entries, both in multiport switches and in other technologies.

After the entry flows through and reaches the bottom of the queue write side 410, the queue overflow engine 416 makes a decision as to what to do with the entry. If there is space in the queue read side 412, and the overflow storage area 414 for that queue 400 is empty, then one or more entries are passed directly from the queue write side 410 to the queue read side 412 along the path designated by the reference numeral 418. This passing of the entry (or entries) directly from the write side 410 to the read side 412 (referred to as "trickling") is performed entirely on the network chip 12, and is therefore a low-latency, fast flow-through of an entry.

If the queue read side 412 is full, and there is at least a burst-size amount of data (e.g., 16 bytes worth of entries) in the queue write side 410, then the data is written in a burst fashion into the overflow storage area 414 for the queue 400. According to the disclosed embodiment of the present invention, any transfer of entries from the queue write side 410 to the overflow storage area 414 is considered to be performed according to an overflow transfer mode. If the queue read side 412 is full, but there is not yet a burst-size amount of data in the queue write side 410, then the entry remains in the queue write side 410 and nothing further is done. Eventually, the queue read side 412 will empty, and when the queue read side 412 has enough space to accommodate a burst-size amount of data, and there is data in the overflow storage area 414, a burst of data is provided from the overflow storage area 414 into the queue read side 412.

In the queue structure 400, the read side 412 is acting most like a traditional queue, because it is from this portion that entries are taken, one by one. The queue write side 410 mostly serves a collection function to assemble the data into bursts for writing to the external memory 36. Hence, the present invention transforms single events (placing an entry into the queue 400) into a burst event. The write side 410 allows an accumulation of data to then burst, if necessary, to the overflow storage area 414 in the external memory 36. The overflow storage area 414 provides inexpensive storage in times of congestion, rather than dedicating expensive chip resources to a function that will only be needed on relatively rare occasions. Even though the present invention utilizes an overflow storage area 414 that is off-chip, the accessing of this area is performed in a manner that is efficient, by bursting a number of bytes of information at a time and utilizing high speed (i.e., less than 10 nanosecond) SSRAM. This is in contrast to conventional queuing structures in which single entries are written and read to and from the queue.

During operation, if there are many entries arriving at the queue 400, these entries are placed into the overflow storage area 414 to avoid overflowing the read side 412. Hence, the discarding of data frames is largely prevented with the queue structure of the present invention. In addition, the total amount of memory dedicated to the overflow storage areas 414 may be readily changed by changing the size of the external memory 36. Furthermore, the sizes of the individual specific overflow storage areas 414 are programmable to customize the queue sizes, without affecting the performance of the queues 400.

A queue is typically an ordered structure with a first-in, first-out arrangement. In some types of queue structures, however, such as the reclaim queue 66 and the free buffer pool 68, the order of entries does not matter. If it is possible to send data directly from the write side 410 to the read side 412, the present invention permits information to be directly sent via this route, hence bypassing the external memory 36. This is permitted even if there is information in the associated overflow storage area 414, as long as the information is not order-sensitive. For example, the reclamation of buffers is not order-sensitive since any order in which the buffers are eventually returned to the free list in the free buffer pool 68 after the buffer is no longer needed to store data frames is acceptable. Hence, in order to avoid incurring the bandwidth of a write to the overflow storage area 414 for the reclaim queue 66 in the external memory 36 when the data is not order-sensitive, the information is passed directly from the write side 410 to the read side 412, assuming the read side 102 has room for more entries. The reclaim queue 66 is an example of a type of queue that queues data which is not order-sensitive. However, there are many other types of data in different applications that are also not order-sensitive, so that this feature of the present invention finds utility in queues that queue these other types of data.

Figure 5:
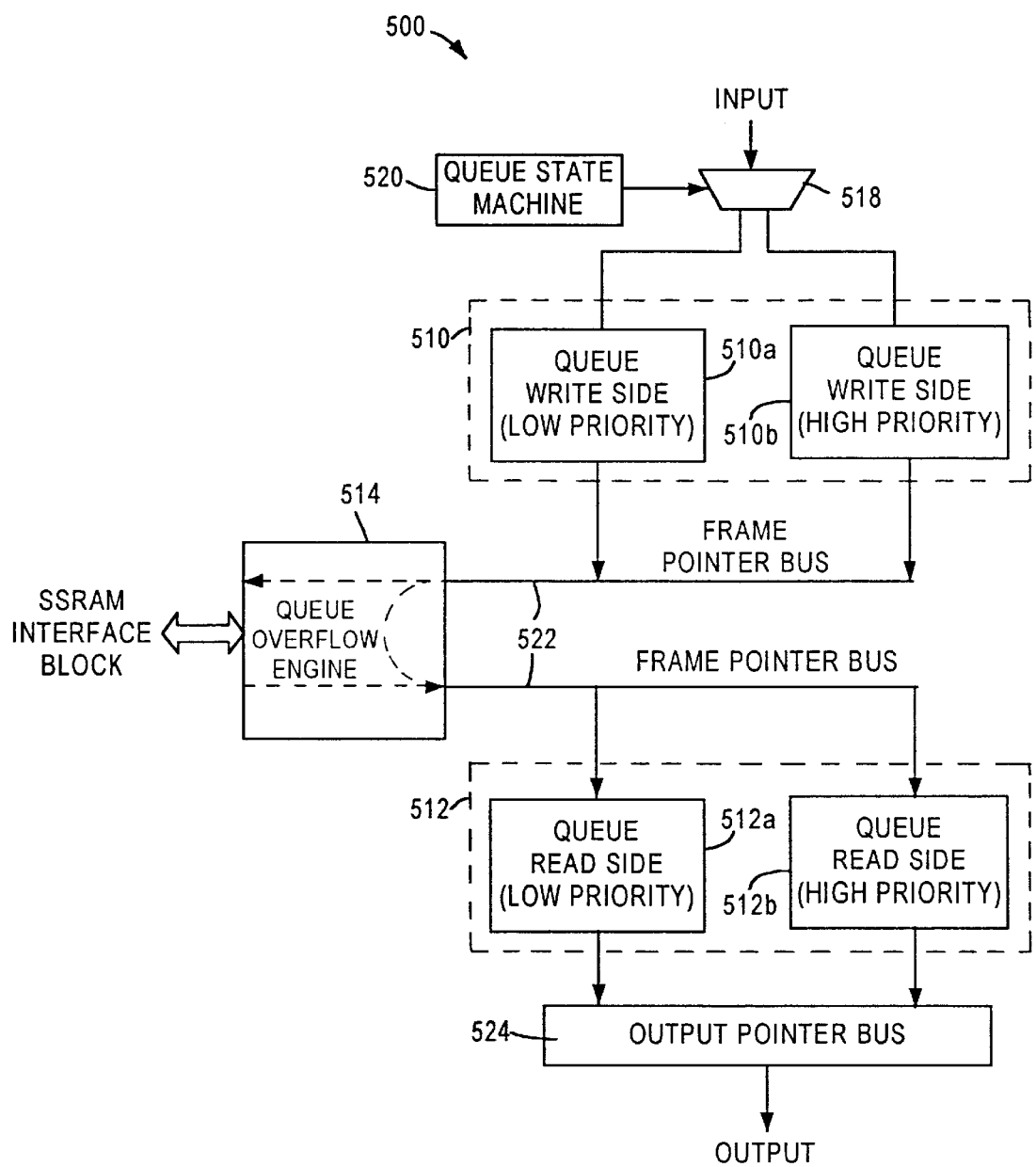
FIG. 5 is a block diagram illustrating a queue structure in accordance with a second embodiment of the present invention.

FIG. 5 is a block diagram of the external structure of a second queue structure 500 having a split-architecture configuration in accordance with second embodiment of the present invention. Similar to queue structure 400 illustrated in FIG. 4, the queue structure 500 illustrated has a split architecture having a three-part configuration. For highest performance, it is preferable to keep all of the queuing structure on the chip (referring to the multiport switch 12). The queue structure 500 includes a high performance, low capacity section that is on-chip, and an overflow area that is off-chip. The overflow area allows the queue to serve as a large capacity queue as needed, albeit with a relatively lower performance than the on-chip portion.

The queue structure 500 illustrated in FIG. 5 incorporates many of the features found in the various types of queues (e.g., reclaim, free buffer, etc.) used in the multiport switch 12. The queue structure 500 includes a queue write side (i.e., write portion) 510 and a queue read side (i.e., read portion) 512. The queue structure 500 may also be provided with an overflow engine 514 that allows data to be written to and retrieved from an external memory 36, such as the external SSRAM.

According to the exemplary embodiment illustrated in FIG. 5, the queue write side 510 may include a low priority portion 510a and a high priority portion 510b. A switching circuit, such as a multiplexer 518, may be provided to forward entries to either the low priority portion 510a or the high priority portion 510b of the queue write side 510. In such a case, the multiplexer 518 may direct the data to the appropriate portion of the queue write side 510 under the control of a queue state machine 520, which examines certain fields in the entry to determine its priority. Alternative logic circuitry may also be provided to receive the entries and determine which portion of the queue write side 510 the entries should be forwarded.

The queue write side 510 is configured to store a prescribed quantity of entries on the switch. Entries are transferred from the queue write side 510 to the queue read side 512 along a frame pointer bus 522 by means of the queue overflow engine 514. Once the queue write side 510 is full, the overflow engine 514 transfers data to the external memory 36 in order to allow input of additional entries into the queue write side 510. The queue read side 512 also stores a prescribed quantity of data. The queue overflow engine 514 monitors the amount of data currently stored in the queue read side 512, and, if data for that queue 500 is stored in the external memory 36, transfers data into the queue read side 512 along the frame pointer bus 522 until the external memory 36 is cleared or the queue read side 512 is full.

Similar to the queue write side 510, the queue read side 512 may include a low priority portion 512a and a high priority portion 512b. The queue overflow engine 514 examines each entry prior to transfer onto the frame pointer bus 522. Entries that are determined to be low priority are transferred to the low priority portion 512a of the queue read side 512, while entries that are determined to be high priority are transferred to the high priority portion 512b of the queue read side 512. Entries are retrieved from the queue structure 500 via the queue read side 512 along an appropriate bus, such as the exemplary output pointer bus 524 illustrated in FIG. 5.

In operation, entries are input to the queue write side 510 from an external source via an appropriate transfer bus. The entries may be received from a variety of sources, such as, for example, the port vector FIFO 56. Additionally, depending on the specific implementation of the queue structure 500, the entries may be prioritized and forwarded to either a low priority portion 512a or a high priority portion 512b of the queue write side 512. The entries are forwarded to the queue read side 512 via the queue overflow logic 514 according to the prioritization identified at the queue write side 510, and the status of entries stored in both the external memory 36 and queue read side 512. Entries are then retrieved from the queue read side 512 via an appropriate bus, such as, for example, the output pointer bus 524.

FIGS. 6A–6D illustrate exemplary internal representations of the various queue structures having split architectures in accordance with the present invention. The queues illustrated in FIGS. 6A–6D are exemplary and intended only to indicate different features of some of the various queues utilized by the multiport switch 12. FIG. 6A illustrates the internal structure of the reclaim queue 66. As previously stated, the reclaim queue 66 stores frame pointers that address the locations of chains of buffers that store received data frames and are no longer needed by the forwarding process. According to the exemplary embodiment illustrated, each frame pointer is thirteen (13) bits long. In addition, the reclaim queue write side 610 is configured to store-sixty four (64) entries 614, while the reclaim queue read side 612 is configured to store sixteen (16) entries 614. As previously stated, each entry in the reclaim queue 66 corresponds to a frame pointer.

FIG. 6B illustrates the internal structure of the free buffer queue 64. The free buffer queue 64 is configured to store sixty-four (64) entries 620 in both the free buffer queue write side 616 and the free buffer queue read side 618. Each entry 620 in the free buffer queue 64 corresponds to a free buffer pointer that addresses the location in the external memory where a free buffer is located.

FIG. 6C illustrates the internal structure of the multicopy queue 60. As previously stated, the multicopy queue 60 differs from the reclaim queue 66 and the free buffer queue 64 in that it does not include three distinct portions. The multicopy queue is in the form of a single FIFO structure that has an input side and an output side. There is no separate overflow portion provided for the multicopy queue. The multicopy queue stores sixteen (16) entries 620. Each entry 620 includes three fields, namely a copy number field 622, a frame pointer field 624, and a single buffer field 626. The copy number field 622 is a 4-bit field that stores a value corresponding to the number of copies of the received data frame that must be transmitted. The frame pointer field 624 is a 13-bit field that stores the value of a frame pointer that addresses the location in the external memory of the first buffer associated with the received data frame. The single buffer field 626 is a single bit field which stores a value that indicates whether or not the received data frame is contained in a single frame buffer.

FIG. 6D illustrates the structure of the multicopy cache 62. The multicopy cache 62 is structured similar to the multicopy queue 60, in that it is in the form of a single FIFO structure having an input side and an output side. The multicopy cache 62 stores 8,192 entries 622 corresponding to the total number of frame pointers available in the external memory at any given moment. Each entry 622 in the multicopy cache 62 is a 4-bit field that stores a value corresponding to the number of copies of the received data frame that must be transmitted. According to the illustrated embodiment, the entries 622 stored in the multicopy cache 62 correspond to the copy number field of the multicopy queue 60.

QUEUE PROCESSING

Figure 7:
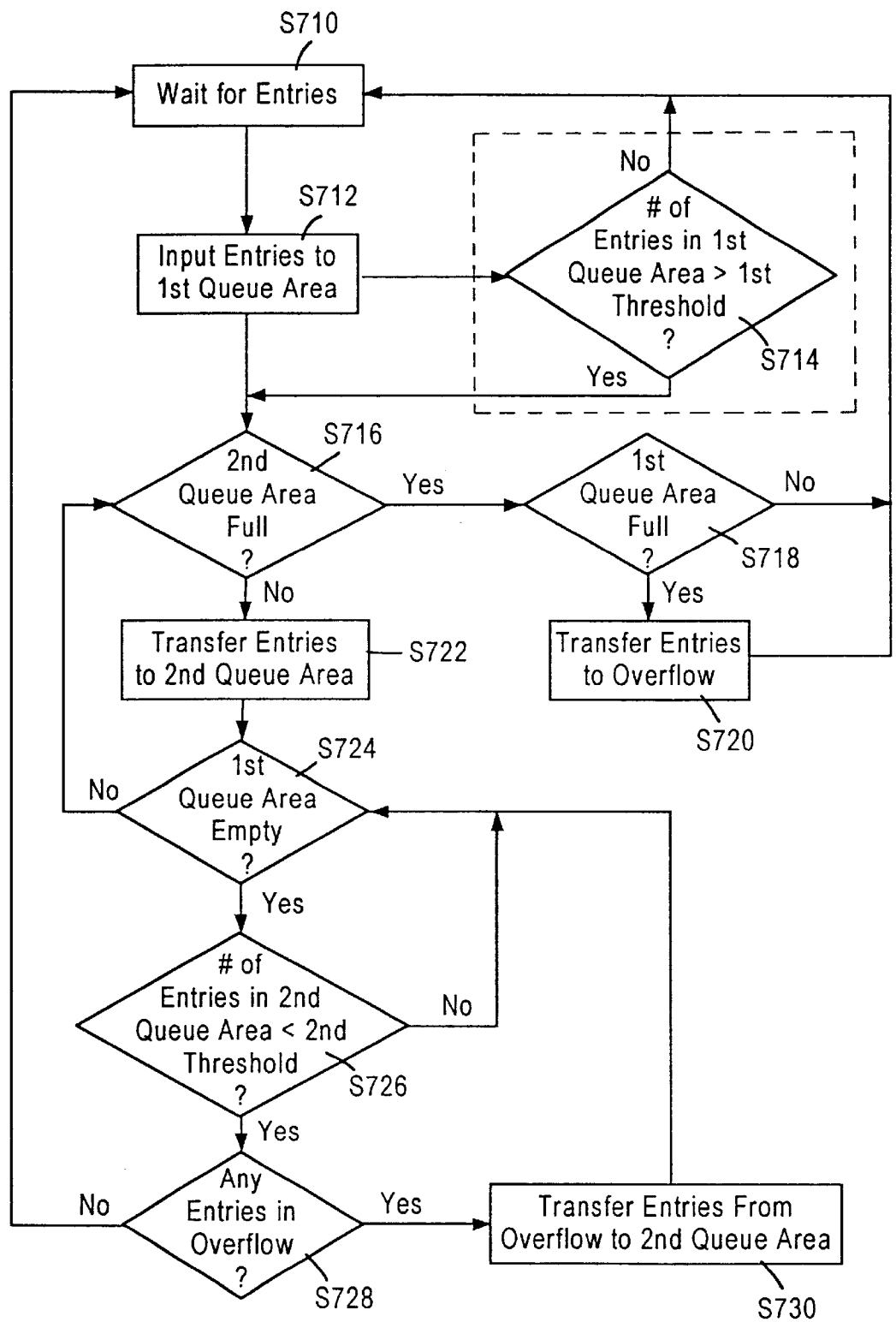
FIG. 7 is a flow chart illustrating the steps performed while processing queue structures in accordance with the present invention.

FIG. 7 is a flow chart illustrating the steps performed while processing a queue structure having a split-architecture, according to an exemplary embodiment of the present invention. At step S710, the queue structure is awaiting entries. This corresponds to an idle state that can move to a non-idle state based on various conditions such as, for example, network activity or data throughput across the multiport switch 12. The entries to the queue structure may be received from various sources, such as, for example, the port vector FIFO 56, the multicopy cache 62, the host CPU 32, etc., depending on the specific queue structure and the application.

At step S712, the entries are input to a first queue area of the queue structure. The first queue area may, for example, correspond to the queue write side. Entries may be continually input into the first queue area until the first queue area reaches a maximum capacity. According to one embodiment of the present invention, entries are input into the first queue area until a first threshold value is reached. The first threshold value corresponds to a maximum number of entries that are allowed in the first queue area before they can be transferred. The first threshold value may, for example, correspond to the maximum capacity of the first queue area, a unitary value (i.e., one entry), or any value therebetween. In addition, the first threshold value may be dynamically adjusted based on network activity or throughput of the queue structure. According to such an embodiment, the number of entries currently stored in the first queue area is compared to the first threshold value at step S714. As indicated by the dashed lines, step S714 is optional and is only performed depending on specific implementations of the invention. If the number of entries in the first queue area is less than the first threshold value, then control returns to step S710 in order to receive new entries. Otherwise, if the number of entries in the first queue area is greater than the first threshold value, then control passes to step S716.

Under normal conditions, entries are transferred from the first queue area to the second queue area as quickly as possible. The second queue area corresponds to the queue read side previously described. Whenever there are entries in the first queue area, the status of the second queue area is examined in order to determine whether the entries in the first queue area may be transferred to the second queue area. For example, at step S716, the queue overflow engine determines whether or not the second queue area is full (i.e., unable to accept any additional entries). If the second queue area is full, then the status of the first queue area is examined. At step S718, the queue overflow engine determines if the first queue area is also full. If the first queue area is not full, then control returns to step S710 in order to await the arrival of new entries. If the first queue area is full, then one or more entries are transferred from the first queue area to the overflow storage area at step S720. Control is then returned to step S710.

According to the disclosed embodiment of the invention, the number of entries transferred to the overflow storage area may dynamically determined by the queue overflow engine, or any similar decision logic, based on current network activities. For example, if many entries are being input to the queue, then the number of entries transferred to the overflow storage area must be sufficient to allocate enough space in the first queue area for input of newer entries until the queue overflow engine can determine the status of the second queue area. This particular arrangement has an advantage of maximizing access to the entries. As previously stated, the overflow storage area is located in external memory. Additionally, access to the external memory is considerably slower than access to the on-chip storage used by the first and second queue areas. By minimizing the number of entries transferred to and retrieved from the overflow storage area, the time required to access the entries is effectively minimized because the queue structure is forced to maximize the use of the on-chip storage.

If the second queue area is not full, then at step S722, entries are transferred from the first queue area directly to the second queue area. The queue overflow engine determines the number of entries to transfer to the second queue area by continually monitoring the status of both the first queue area and the second queue area. As illustrated in FIG. 7, at step S724, the queue overflow engine determines if the first queue area is empty. If the first queue area is not empty, then control returns to step S716. At such time, the queue overflow engine checks the status of the second queue area in order to determine whether additional entries may be transferred from the first queue area. This sequence is repeated until the first queue area is empty or the second queue area is full.

Control passes to step S726 if the queue overflow engine determines that the first queue area is empty. At step S726, the queue overflow engine determines if the number of entries in the second queue area is below a second threshold value. The second threshold value corresponds to a minimum number of entries that the queue overflow engine assigns to the second queue area. The second threshold value may be dynamically adjusted based on the number of entries passing through the queue structure. The second threshold value is selected to minimize access times while providing a high storage capacity.

According to one embodiment of the present invention, the number of entries in the second queue area is allowed to decrease (i.e., retrieved from the queue structure) for a prescribed time interval while waiting for entries to be input to the first queue area. The prescribed time interval is determined by continually checking the status of the first queue area in order to determine whether any new entries have been input. As illustrated in FIG. 7, if the number of entries in the second queue area is above the second threshold value, then control returns to step S724, where the status of the first queue area is determined. If the number of entries in the second queue area is less than the second threshold value, then control passes to step S728. According to steps S724 and S726 of the disclosed embodiment, the second threshold value corresponds to a minimum number of entries that the queue overflow engine determines to be allowable within the second queue area while the status of the first queue area is determined.

The prescribed time interval is a dynamic value that fluctuates based on various conditions. The most significant condition that affects the prescribed time interval is the second threshold value. For example, if the second threshold value is set too high, the amount of time allowed to wait for entries to be input to the first queue area will be unnecessarily reduced because for most instances, the number of entries in the second queue area will be below the second threshold value. If the second threshold value is set too low, then it is possible that the amount of time allowed to wait for entries will be too long, hence increasing the probability that all entries will be retrieved from the second queue area before new entries are input to the first queue area. It is therefore beneficial to dynamically adjust the value of the second threshold value based on real time conditions.

Another condition that affects the prescribed time interval is the frequency with which entries are retrieved from the second queue area. For example, if entries are retrieved from the second queue area at a high rate, then the second threshold value must be set high enough to allow the queue overflow engine the opportunity to check the status of the first queue area and implement an appropriate course of action.

As illustrated by the exemplary flow chart of FIG. 7, if the number of entries in the second queue area is below the second threshold level, then the queue overflow engine checks to see if any entries are currently stored in the overflow storage area at step S728. If the overflow storage area is empty, then control returns to step S710 to await the arrival of new entries. If there are entries currently stored in the overflow storage area, then at step S730, one or more entries are transferred from the overflow storage area to the second queue area. Control is then returned to step S724 where the status of the first queue area is determined.

The number of entries transferred from the overflow storage area may, for example, be dynamically determined by the queue overflow engine, or any similar decision-making logic, based on current network activities. For example, if the entries are being quickly retrieved from the second queue area, then the number of entries transferred from the overflow storage area must be sufficient to provide the queue overflow engine with enough time to check the status of the first queue area and make an appropriate decision before the second queue area is depleted of entries. This particular arrangement has an advantage of maximizing the speed with which entries are transferred to the second queue area. As previously stated, access to the external memory (where the overflow storage area is located) is considerably slower than access to the on-chip storage used by the first and second queue areas. Therefore, the queue structure is forced to maximize the use of the on-chip storage by primarily retrieving entries from the first queue area while minimizing the number of entries retrieved from the overflow storage area.

The queue processing steps illustrated in FIG. 7 are particularly useful in situations where the ordering of entries into the queue does not need to be maintained. For example, certain queue structures (i.e., the free buffer queue) used by the multiport switch 12 do not require that the ordering of entries be maintained. In such situation, the split-queue architecture of the present invention minimizes latency, while maximizing storage capacity. This is accomplished by minimizing use of the overflow memory area (for both storage and retrieval) until it is necessary.

Figure 8:
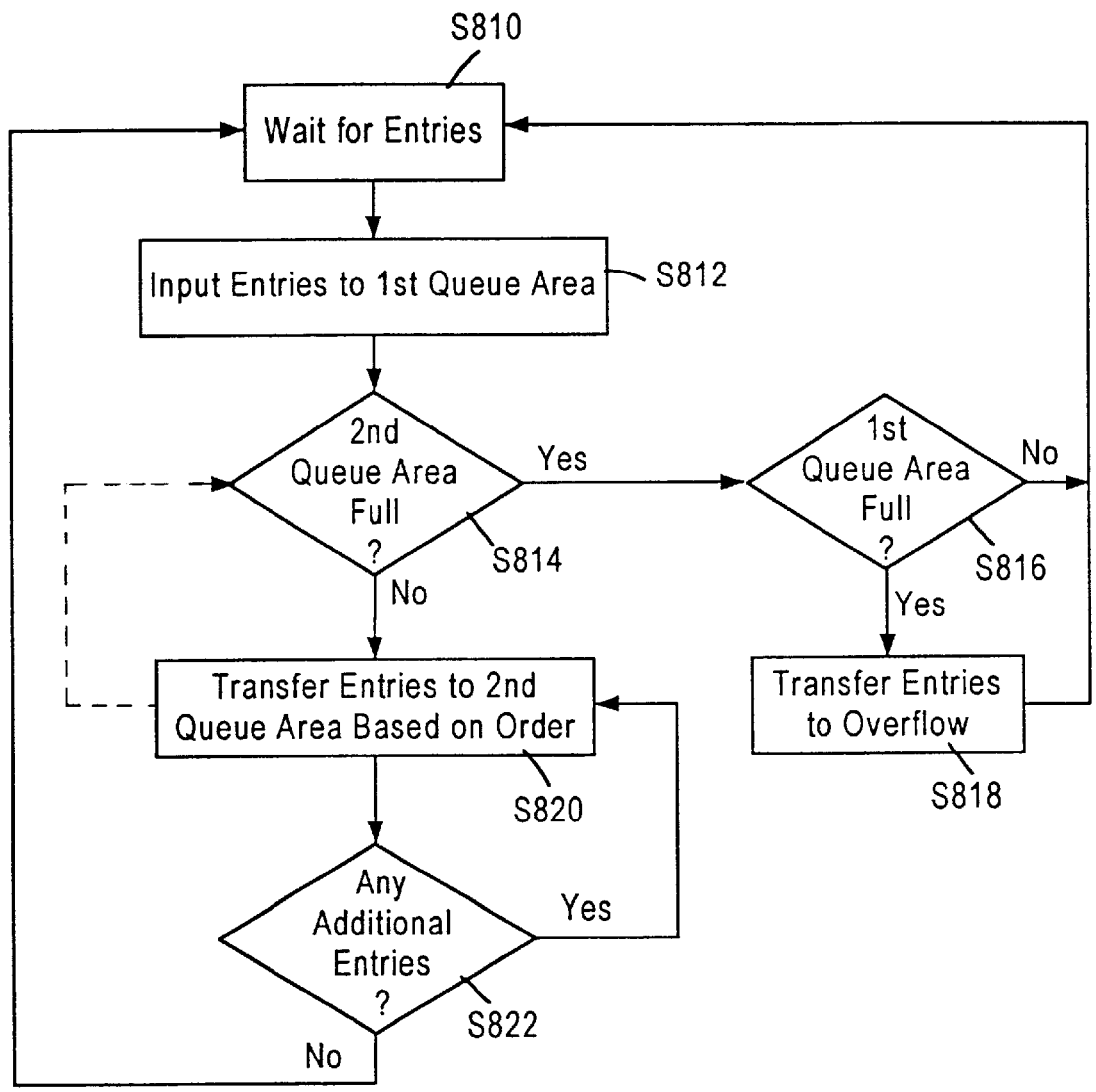
FIG. 8 is a flow chart illustrating the steps performed while processing queue structures according to a second embodiment of the present invention.

FIG. 8 is a flow chart illustrating the steps performed while processing a queue structure having a split-architecture, according to a second exemplary embodiment of the present invention. At step S810, the queue structure is awaiting entries. Again, this corresponds to an idle state that can move to a non-idle state based on various conditions such as, for example, network activity or data throughput across the multiport switch 12. As previously stated with reference to FIG. 7, the entries may be received from various sources, such as, for example, the port vector FIFO 56, the multicopy cache 62, the host CPU 32, etc., depending on the specific queue structure and the application.

At step S812, the entries are input to the first queue area of the queue structure. As previously stated, the first queue area may, for example, correspond to the queue write side. During normal conditions, entries are continually input to the first queue area and transferred to the second queue area as quickly as possible. The second queue area corresponds to the queue read side. The status of the second queue area is examined whenever entries are present in the first queue area, in order to determine whether such entries may be transferred to the second queue area. This examination is performed at step S814, where the queue overflow engine determines whether or not the second queue area is full (i.e., unable to accept any additional entries). If the second queue area is full, then at step S816, the queue overflow engine determines if the first queue area is also full. If the first queue area is not full, then control returns to step S810 in order to await the arrival of new entries. If the first queue area is full, then entries are transferred from the first queue area to the overflow storage area at step S818. Control is then returned to step S810. This provides the multiport switch an opportunity to retrieve entries from the second queue area.

If the second queue area is not full, then entries are transferred to the second queue area at step S820. The queue overflow engine keeps track of an arrival time (or similar sequencing scheme) of each entry that passes through the first queue area. The arrival time corresponds to the order in which the entries were input into the first queue area and takes into account entries that are stored in the overflow storage area in order to maintain the original order. The queue overflow engine then transfers entries to the second queue area from either the first queue area or the overflow storage are, based on the arrival time (i.e., the order in which they were received).

The queue overflow engine continuously transfers entries to the second queue area and must therefore closely monitor the second queue area. This is illustrated in FIG. 8 using the dashed line from step S820 to S814. At step S822, the queue overflow engine determines if there are additional entries to be input to the second queue area. If there are additional entries, then control returns to step S820 and entries are transferred from either the first queue area or the overflow storage area. If there are no additional entries, then control returns to step S810 in order to await the arrival of new entries.

The queue processing steps illustrated in FIG. 8 are particularly suited for use with queue structures that require that the order in which entries are received be maintained. An example of such a queue is a traditional FIFO queue. The multiport switch of the present invention includes several such queues, including the output queue 58 and the port vector FIFO 56. According to the embodiment of the present invention disclosed in FIG. 8, the queue structure may be provided to optimize latency, while simultaneously providing a large storage capacity. Furthermore, the additional storage capacity need only be utilized when necessary, such as, for example, during periods of unusually heavy network activity. The size on-chip memory area may be selected to provide optimal performance during what is determined to be "normal" operating conditions (i.e., the average level of throughput expected).

While this invention has been described in connection with what is presently considered to be the most practical and preferred embodiment, it is to be understood that the invention is not limited to the disclosed embodiment, but, on the contrary, is intended to cover various modifications and equivalent arrangements included within the scope of the appended claims.

What is claimed is:

1. A queue structure for queuing entries, comprising:

a first queue area for receiving entries, said first queue area including an input portion and an output portion;

a second queue area for outputting entries input to said first queue area, said second queue area including an input portion and an output portion;

a queue overflow engine logically coupled to both said first queue area and said second queue area, said queue overflow engine including logic circuitry for transferring entries from said first queue area to said second queue area using one of a trickle mode and an overflow mode, based on a prescribed threshold value that identifies one of a maximum number of entries allowed in said first queue area and a minimum number of entries allowed in said second queue area;

an overflow storage area operatively coupled to said queue overflow engine for selectively receiving entries from said first queue area and forwarding said entries to said second queue area, said overflow storage area having a relatively larger storage capacity than said first and second queue areas;

wherein said prescribed threshold value identifies a predetermined number of entries allowed in said first queue area, and said logic circuitry is further configured to:

compare the number of entries stored in said second queue area to a second prescribed threshold value that identifies a minimum number of entries allowed in said second queue area; and if the number of entries stored in said second queue area is less than said second threshold value, then transferring entries into said second queue area using said trickle mode.

2. The queue structure of claim 1, wherein said overflow mode requires a first transfer of entries from the output portion of said first queue area into said overflow storage area, and a second transfer of entries from said overflow storage area into the input portion of said second queue area.

3. The queue structure of claim 1, wherein said trickle mode requires a transfer of entries directly from the output portion of said first queue area into the input portion of said second queue area.

4. The queue structure of claim 1, wherein said queue overflow engine transfers entries from said first queue area to said second queue area based on a priority associated with each entry.

5. The queue structure of claim 1, wherein said prescribed threshold value identifies a maximum number of entries allowed in said first queue area.

6. The queue structure of claim 1, wherein said prescribed threshold value identifies a minimum number of entries allowed in said second queue area.

7. The queue structure of claim 1, wherein said logic circuitry is further configured to perform the steps:
   determine if said first queue area is empty; and
   if said first queue area is empty, then performing the steps:
      waiting a prescribed time interval for entries to be input to said first queue area,
      if entries are input into said first queue area within said prescribed time interval, then transferring entries from said first queue area into said second queue area using said trickle mode, and
      if no entries are input into said first queue area within said prescribed time interval, then transferring entries from said external memory area into said second queue area.

8. The queue structure of claim 7, wherein said prescribed time interval is determined based on the time required for the number of entries stored in said second queue area to reach said second prescribed threshold value.

9. A method of queuing entries into a queue structure, the method comprising the steps:
   receiving entries in a first queue area of the queue structure;
   comparing the number of entries stored in the first queue area to a prescribed threshold value that identifies one of a maximum number of entries allowed in the first queue area and a minimum number of entries allowed in the second queue area; and
   transferring entries from the first queue area into a second queue area using one of a trickle mode and an overflow mode, based on the step of comparing;
   determining, prior to performing the step of transferring, if there is available capacity in the second queue area;
   performing the step of transferring based on both the step of comparing and the step of determining;
   wherein the prescribed threshold value corresponds to a maximum number of entries allowed in the first queue area, and further comprising a step of setting a second threshold value corresponding to a minimum number of entries allowed in the second queue area;
   wherein the step of transferring entries from the first queue area comprises the steps:
      determining if the number of entries in the first queue area is greater than the first threshold value;
      receiving additional entries into the first queue area if the number of entries stored therein is less than the first threshold value; and
      transferring entries to an overflow storage area if the number of entries in the first queue area exceeds the first threshold value and the number of entries in the second queue area exceeds the second threshold value.

10. The method of claim 9, wherein a trickle mode is used, and the step of transferring entries from the first queue area includes a step of transferring entries from an output portion of the first queue area directly into an input portion of the second queue area.

11. The method of claim 9, wherein an overflow mode is used, and the step of transferring entries from the first queue area further includes the steps:
   transferring entries from the first queue area into an overflow storage area; and
   transferring entries from the overflow storage area into the second queue area.

12. The method of claim 9, wherein it is determined that there is available capacity in the second queue area, and the step of transferring includes a step of transferring entries from the first queue area into the second queue area using the trickle mode.

13. The method of claim 9, wherein it is determined that there is no available capacity in the second queue area, and the step of transferring includes a step of transferring entries from the first queue area into the second queue area using the overflow mode.

14. The method of claim 9, further comprising a step of dynamically setting the prescribed threshold value and the second threshold value based on the relative throughput of the queue structure.

* * * * *